United States Patent
Chou et al.

(10) Patent No.: US 11,971,742 B2
(45) Date of Patent: Apr. 30, 2024

(54) DISPLAY ASSEMBLY

(71) Applicants: MICRO-STAR INT'L CO., LTD., New Taipei (TW); MSI COMPUTER (SHENZHEN) CO., LTD., Shenzhen (CN)

(72) Inventors: Ping-Cheng Chou, New Taipei (TW); Huang-Lei Sun, Hualien County (TW); Chuan Li Kao, Taoyuan (TW)

(73) Assignees: MICRO-STAR INT'L CO., LTD., New Taipei (TW); MSI COMPUTER (SHENZHEN) CO., LTD., Shenzhen (CN)

( * ) Notice: Subject to any disclaimer, the term of this patent is extended or adjusted under 35 U.S.C. 154(b) by 224 days.

(21) Appl. No.: 17/834,743

(22) Filed: Jun. 7, 2022

(65) Prior Publication Data
US 2023/0393613 A1 Dec. 7, 2023

(51) Int. Cl.
*G06F 1/16* (2006.01)
(52) U.S. Cl.
CPC ................. *G06F 1/1607* (2013.01)
(58) Field of Classification Search
CPC ...... G06F 1/1607; G06F 1/1605; F16M 11/04
See application file for complete search history.

(56) References Cited

U.S. PATENT DOCUMENTS

| | | | | |
|---|---|---|---|---|
| 6,354,552 B1* | 3/2002 | Chiu | ..................... | F16M 11/18 248/422 |
| 8,891,248 B2* | 11/2014 | Chu | ...................... | F16M 11/10 248/397 |
| 10,133,315 B2* | 11/2018 | Gault | .................. | E05B 47/0001 |
| 10,724,279 B2* | 7/2020 | Wilke | .................. | E05D 7/1022 |
| 10,808,878 B2* | 10/2020 | Lee | ...................... | F16M 11/041 |
| 11,489,274 B2* | 11/2022 | Wang | ................... | H05K 7/1489 |
| 11,789,500 B2* | 10/2023 | Yang | ..................... | G06F 1/1681 16/223 |
| 11,849,552 B2* | 12/2023 | Pawlenko | ............ | H05K 5/0234 |
| 2023/0003335 A1* | 1/2023 | Chung | .................. | F16M 11/22 |

* cited by examiner

*Primary Examiner* — Rockshana D Chowdhury
(74) *Attorney, Agent, or Firm* — Maschoff Brennan

(57) ABSTRACT

A display assembly including a stand, a mounting assembly and a display. The mounting assembly includes a fixed base, a first pivot, a pivotable base, a second pivot, a handle, a plurality of first engagement structures and a second engagement structure. The handle includes a handheld part and a mounting part. The mounting part is connected to the handheld part and pivotally connected to the pivotable base via the second pivot. The first engagement structures are disposed at one of the fixed base and the mounting part of the handle. The second engagement structure is disposed at another one of the fixed base and the mounting part of the handle. The display is fixed on the pivotable base. The first pivot is not coaxial with the second pivot so that the second engagement structure is configured to be engaged with any one of the first engagement structures.

10 Claims, 9 Drawing Sheets

DISPLAY ASSEMBLY

TECHNICAL FIELD

The disclosure relates to display assembly, more particularly to a display assembly including at least one handle.

BACKGROUND

In general, in using a point-of-sale (POS) machine, a touch screen is required to be pivotable relative to a stand via a pivot assembly so as to facilitate users of different heights to touch the touch screen. In addition, in order to prevent the touch screen from being unintentionally pivoted relative to the stand when the user touches the touch screen, a lock pin is inserted into the pivot assembly to fix the touch screen in position.

However, the lock pin should be firstly removed from the pivot assembly before the touch screen is allowed to be pivoted relative to the stand. On the other hand, when the touch screen is required to be positioned, the user should use one hand to support the touch screen and simultaneously use the other hand to insert the lock pin into the pivot assembly. That is, holding the touch screen in a desired angle and inserting the pin are unable to be finished by one hand during the positioning of the touch screen.

SUMMARY

The disclosure provides a display assembly which allows the display to be adjusted to a desired angle and fixed in position by one hand at a time.

One embodiment of this disclosure provides a display assembly including a stand, a mounting assembly and a display. The mounting assembly includes a fixed base, a first pivot, a pivotable base, a second pivot, a handle, a plurality of first engagement structures and a second engagement structure. The fixed base is fixed to the stand. The first pivot is disposed on the fixed base. The pivotable base is disposed on the first pivot and pivotally connected to the fixed base via the first pivot. The second pivot is disposed on the pivotable base. The handle includes a handheld part and a mounting part. The mounting part is connected to the handheld part and pivotally connected to the pivotable base via the second pivot. The second engagement structure corresponds to the plurality of first engagement structures. The plurality of first engagement structures are disposed at one of the fixed base and the mounting part of the handle. The second engagement structure is disposed at another one of the fixed base and the mounting part of the handle. The display is fixed on the pivotable base. The first pivot is not coaxial with the second pivot so that the second engagement structure is configured to be engaged with any one of the plurality of first engagement structures.

Another embodiment of this disclosure provides a display assembly including a stand, a fixed base, a first pivot, a display, a second pivot, a handle, a plurality of first engagement structures and a second engagement structure. The fixed base is fixed to the stand. The first pivot is disposed on the fixed base. The display is disposed on the first pivot and pivotally connected to the fixed base via the first pivot. The second pivot is disposed on the display. The handle includes a handheld part and a mounting part. The mounting part is connected to the handheld part and is pivotally connected to the display via the second pivot. The second engagement structure corresponds to the plurality of first engagement structures. The plurality of first engagement structures are disposed at one of the fixed base and the mounting part of the handle. The second engagement structure is disposed at another one of the fixed base and the mounting part of the handle. The first pivot is not coaxial with the second pivot so that the second engagement structure is configured to be engaged with any one of the plurality of first engagement structures.

According to the display assembly disclosed by the above embodiments, since the first pivot is not coaxial with the second pivot, the second engagement structure disposed on the handle pivotally connected to the pivotable base via the second pivot is allowed to be moved along the radial direction of the first pivot so as to be fitted and engaged with any one of the first engagement structures. In this way, by holding the handheld part of the handle and the display with one hand, the user is allowed to pivot the handle relative to the display via the second pivot to force the second engagement structure to be detached from one of the first engagement structures, thereby by releasing the display. Then, by keeping holding the handheld part of the handle and the display with one hand, the user is allowed to pivot the display relative to the base via the first pivot to adjust the angle therebetween, and then the handle can be pivoted relative to the display via the second pivot to engage and fit the second engagement structure with another one of the first engagement structures, thereby positioning the display. That is, with the help of the mounting assembly according to this disclosure, the display can be adjusted to a desired angle and fixed in position by one hand at a time.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
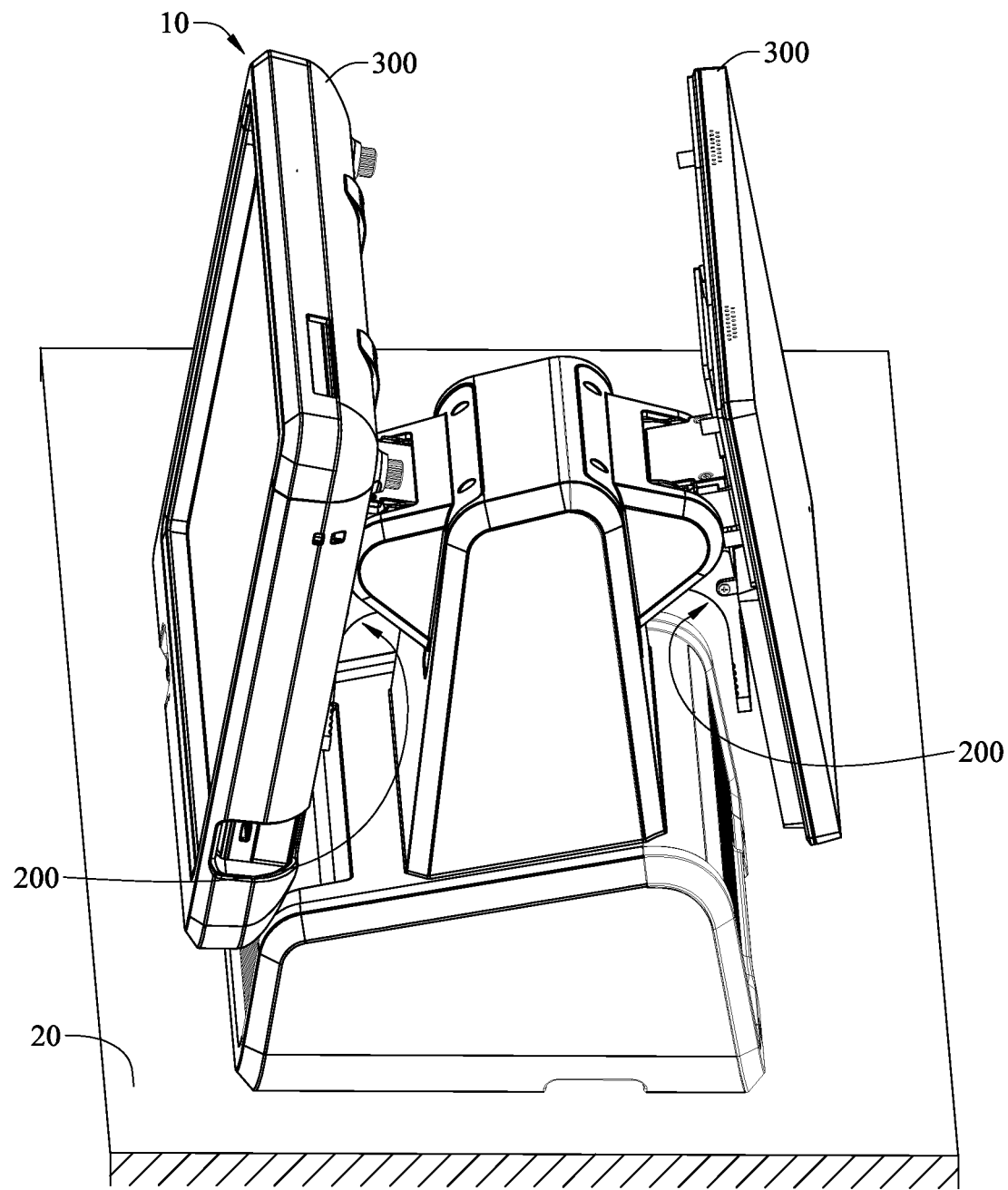
FIG. 1 is a perspective view of a display assembly according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
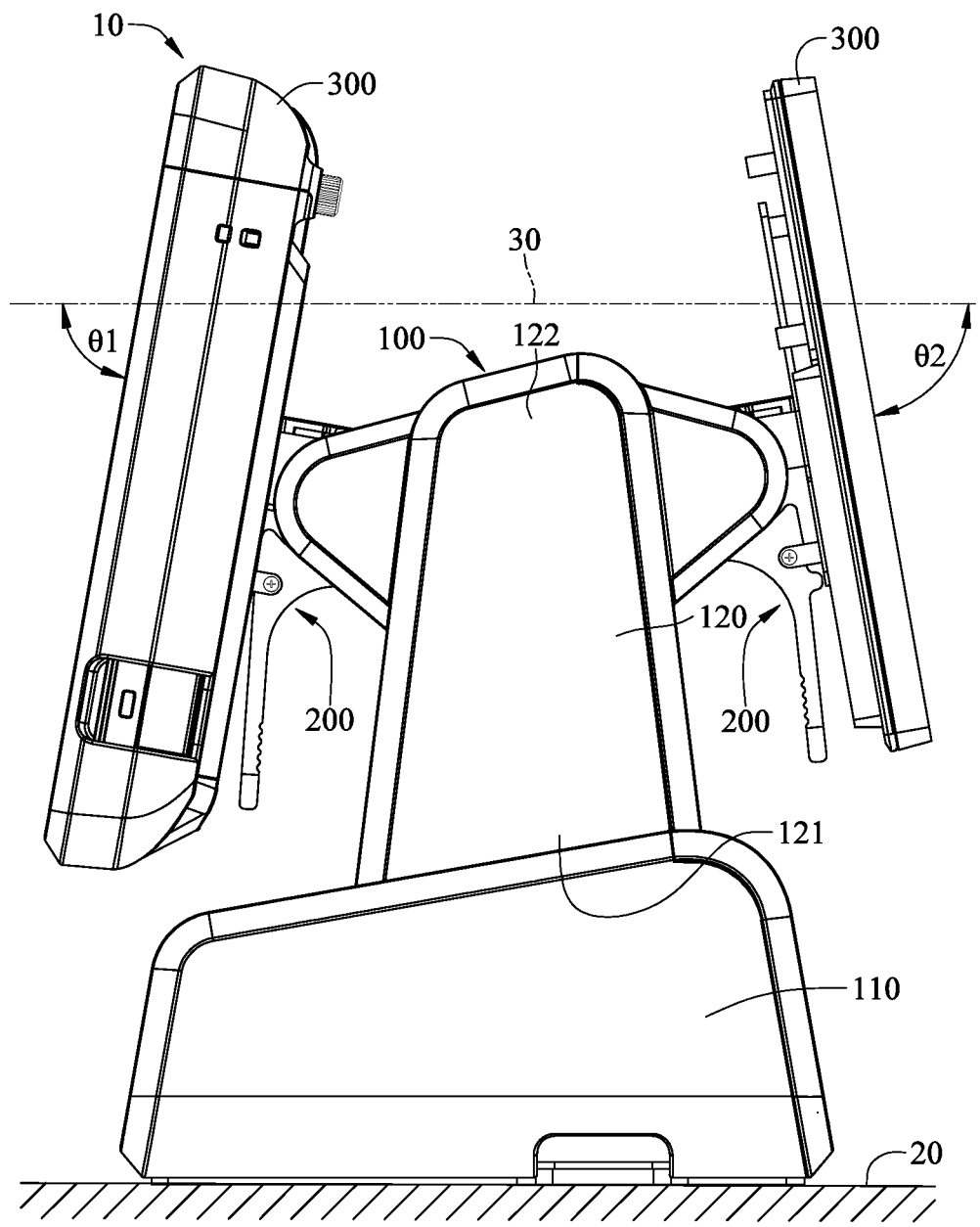
FIG. 2 is a side view of the display assembly in FIG. 1.

Please refer to FIGS. 1 and 2, where FIG. 1 is a perspective view of a display assembly 10 according to a first embodiment of the disclosure, and FIG. 2 is a side view of the display assembly 10 in FIG. 1.

In this embodiment, the display assembly 10 is a part of, for example, a point-of-sale (POS) machine, and the display assembly 10 includes a stand 100, two mounting assemblies 200 and two displays 300. Note that the disclosure is not limited by a quantity of the mounting assemblies 200 and a quantity of the displays 300. In other embodiments, the display assembly may merely include one mounting assembly and one display.

In this embodiment, the stand 100 includes a base 110 and a mounting arm 120. The mounting arm 120 includes a first end part 121 and a second end part 122 that are opposite to each other. The base 110 is disposed on the first end part 121. The base 110 is configured to be placed on a supporting surface 20 that is, for example, a surface of a desk or a table.

The two displays 300 are disposed on two opposite sides of the second end part 122 via the two mounting assemblies 200, respectively. The two displays 300 are, for example, touch screens configured to display one or more images. Note that since the two displays 300 are mounted on the stand 100 via the two mounting assemblies 200 in a similar manner, only the detail structures, connection relationships and operations of one mounting assembly 200 and one display 300 that are corresponding to each other are described in detail hereinafter.

Figure 3:
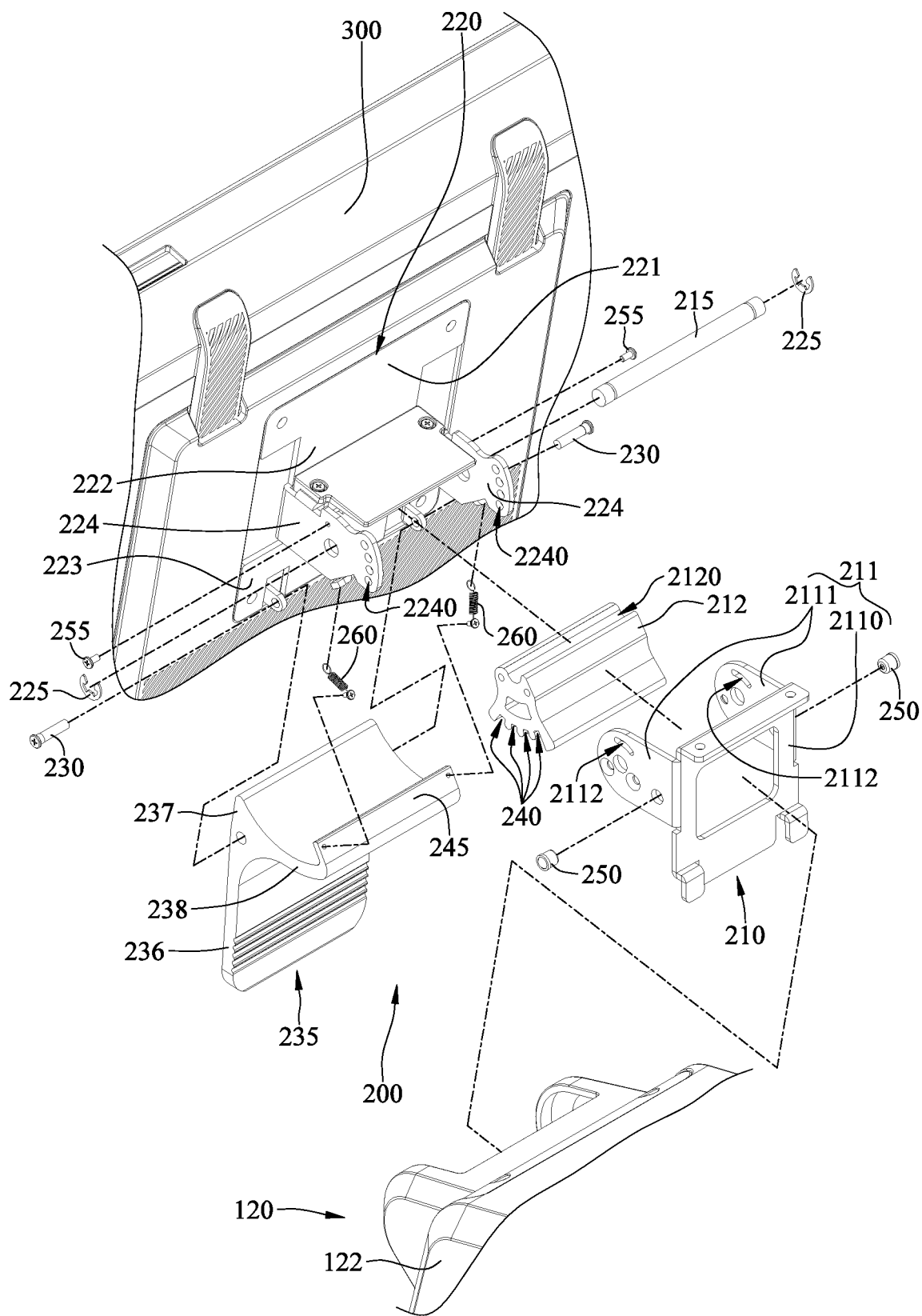
FIG. 3 is a partial exploded view of the display assembly in FIG. 1.
Figure 4:
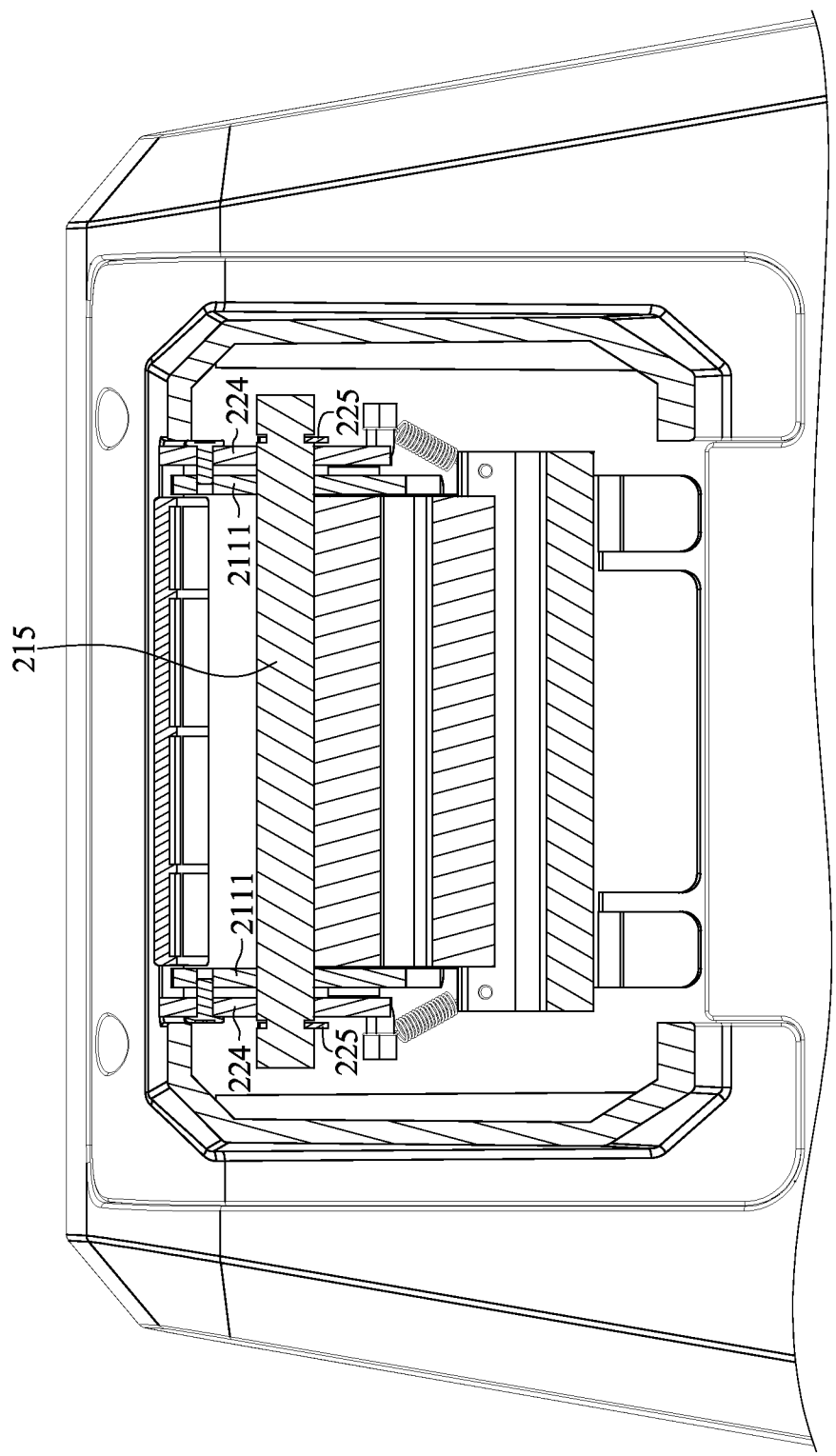
FIG. 4 is a partially enlarged and front cross-sectional view of the display assembly in FIG. 1.

Please refer to FIGS. 3 and 4, where FIG. 3 is a partial exploded view of the display assembly 10 in FIG. 1, and FIG. 4 is a partially enlarged and front cross-sectional view of the display assembly 10 in FIG. 1.

In this embodiment, the mounting assembly 200 includes a fixed base 210, a first pivot 215, a pivotable base 220, two E-type buckles 225, two second pivots 230, a handle 235, a plurality of first engagement structures 240, a second engagement structure 245, two positioning components 250, two restriction components 255 and two elastic components 260.

The fixed base 210 includes a mounting bracket 211 and a mounting body 212. The mounting bracket 211 includes a bottom plate 2110 and two side plates 2111. The two side plates 2111 stand on the same side of the bottom plate 2110 and are spaced apart from each other. The mounting body 212 is fixed to the two side plates 2111 via, for example, screwing. The mounting body 212 is located between the two side plates 2111. The mounting bracket 211 is fixed to the second end part 122 of the mounting arm 120 of the stand 100. The mounting body 212 has a recess 2120.

The first pivot 215 is disposed in the recess 2120 of the mounting body 212, and is disposed through the two side plates 2111. In this embodiment, the first pivot 215 is, for example, a pivot shaft. Note that in other embodiments, the mounting body may not have the recess 2120 and the first pivot may be disposed through the mounting body.

In this embodiment, the pivotable base 220 is pivotally connected to the fixed base 210 via the first pivot 215. In this embodiment, the pivotable base 220 includes a first plate part 221, a second plate part 222, a third plate part 223 and two side plate parts 224. The first plate part 221 and the third plate part 223 are connected to two opposite sides of the second plate part 222, respectively. The two side plate parts 224 stand on the same side of the second plate part 222 and are spaced apart from each other. The display 300 is fixed to the first plate part 221. The first pivot 215 is disposed through the two side plate parts 224. In addition, as shown in FIG. 4, the two side plates 2111 of the mounting bracket 211 of the fixed base 210 are located between the two side plate parts 224, but the disclosure is not limited by the position relationship between the two side plates 2111 and the two side plate parts 224. In other embodiments, the two side plate parts may be located between the two side plates of the mounting bracket of the fixed base.

Note that in this embodiment, the display 300 and the pivotable base 220 are two pieces that are assembled to each other, but the disclosure is not limited thereto. In other embodiments, the display and the pivotable base may be integrally formed as a single piece. In such embodiments, the display and the pivotable base may together be refer as a display.

The two E-type buckles 225 are disposed on two opposite ends of the first pivot 215, respectively. Also, as shown in FIG. 4, the two side plate parts 224 are located between the two E-type buckles 225. Thus, the two E-type buckles 225 prevent the first pivot 215 from being detached from the two side plate parts 224 or the two side plates 2111. Note that in other embodiments, the mounting assembly may not include the E-type buckles 225.

The second pivots 230 are disposed through the third plate part 223, and are, for example, stepped screws. The first pivot 215 is not coaxial with the second pivots 230. Note that in this embodiment, the mounting assembly 200 include two second pivots 230, but the disclosure is not limited thereto. In other embodiments, the mounting assembly may merely include one second pivot.

Figure 5:
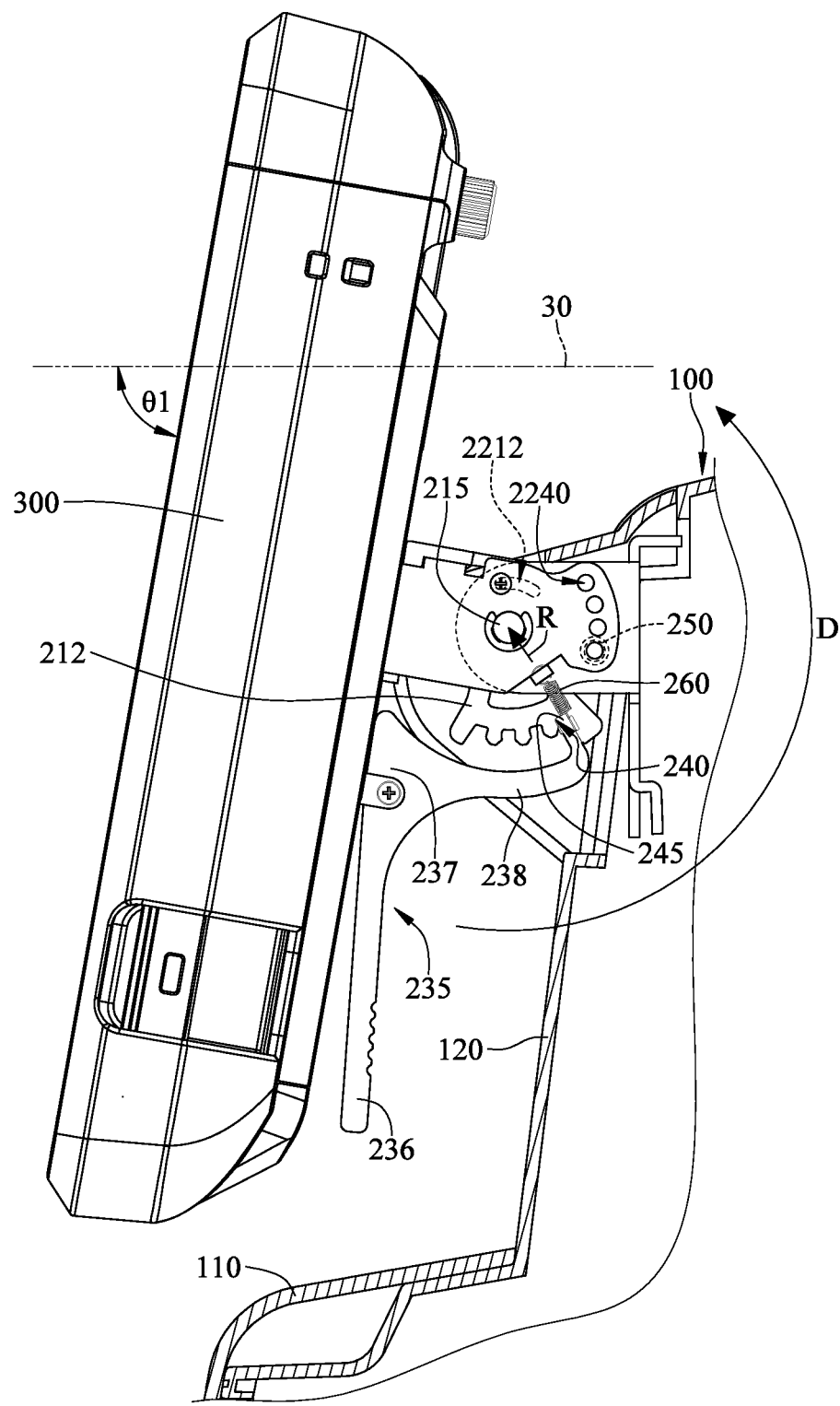
FIG. 5 is a partially enlarged and side cross-sectional view of the display assembly in FIG. 1.

Please refer to FIGS. 3 and 5, where FIG. 5 is a partially enlarged and side cross-sectional view of the display assembly 10 in FIG. 1. In this embodiment, the handle 235 includes a handheld part 236, a mounting part 237 and an extension part 238. The mounting part 237 and the extension part 238 are connected to different sides of the handheld part 236, respectively. The mounting part 237 is pivotally connected to the third plate part 223 of the pivotable base 220 via the second pivots 230. For example, the mounting part 237 is pivotally connected to the third plate part 223 of the pivotable base 220 via a smooth portion (e.g., a portion without threads) of the second pivots 230 that is a stepped screw. In addition, in this embodiment, the handheld part 236 of the handle 235 is located adjacent to a side of the display 300 that is located closest to the base 110. Furthermore, in this embodiment, the extension part 238 protrudes from the mounting part 237 along a circumferential direction D of the first pivot 215.

In this embodiment, for example, the first engagement structures 240 and the second engagement structure 245 are engagement grooves and engagement protrusion that are configured to be fitted and engaged with each other via snap-fit. The first engagement structures 240 are spaced apart from one another and are disposed at the mounting body 212 of the fixed base 210. In addition, as shown in FIG. 3, the recess 2120 and the first engagement structures 240 are disposed at two opposite sides of the mounting body 212, respectively. As shown in FIG. 5, the first engagement structures 240 are arranged along, for example, the circumferential direction D of the first pivot 215. The second engagement structure 245 is disposed at a side of the extension part 238 of the handle 235 that is located farthest from the mounting part 237. That is, the second engagement structure 245 is disposed at the mounting part 237 via the extension part 238. Additionally, in this embodiment, as shown in FIG. 5, the second engagement structure 245 extends along a radial direction R of the first pivot 215. In this embodiment, the second engagement structure 245 and the handle 235 are, for example, integrally formed as a single piece. Since the first pivot 215 is not coaxial with the second pivots 230, the second engagement structure 245 is configured to be fitted and engaged with any one of the first engagement structures 240.

Note that the disclosure is not limited to the position of the first engagement structures 240 and the position of the second engagement structure 245. In other embodiment, the first engagement structures and the second engagement structure may be disposed on a side of the extension part of the handle that is located farthest from the mounting part and the mounting body of the fixed base, respectively. That is, in other embodiments, there may be a plurality of engagement grooves on the extension part of the handle and there may be an engagement protrusion on the mounting body of the fixed base. The disclosure is not limited to the type of the first engagement structures 240 and the type of the second engagement structure 245. In other embodiments, the first engagement structures and the second engagement structure may be engagement protrusions and an engagement groove that are fitted and engaged with each other via snap-fit. That is, in other embodiments, there may be a single engagement groove on the mounting body of the fixed base and there may be a plurality of engagement protrusions on the extension part of the handle.

As shown in FIGS. 3 and 5, in this embodiment, each side plate part 224 has a plurality of positioning holes 2240 are arranged along the circumferential direction D of the first pivot 215. Sides of the two positioning components 250 are fixed to the two side plates 2111, respectively. The other sides of the two positioning components 250 are configured to be fixed in any one of the positioning holes 2240 of the two side plate parts 224, respectively.

Please refer to FIGS. 3 and 5. In this embodiment, each side plate 2111 has a restricting hole 2112 extending along the circumferential direction D of the first pivot 215. Sides of the two restriction components 255 are fixed to the two side plate parts 224, respectively. The other sides of the two restriction components 255 are slidably disposed in the restricting holes 2112 of the two side plates 2111, respectively. In addition, in this embodiment, the two restriction components 255 are, for example, screws.

In this embodiment, the two elastic components 260 are, for example, extension springs. Two opposite ends of one elastic component 260 are fixed to one side plate part 224 of the pivotable base 220 and the second engagement structure 245, respectively. Two opposite ends of the other elastic component 260 are fixed to the other side plate part 224 of the pivotable base 220 and the second engagement structure 245, respectively.

Figure 6:
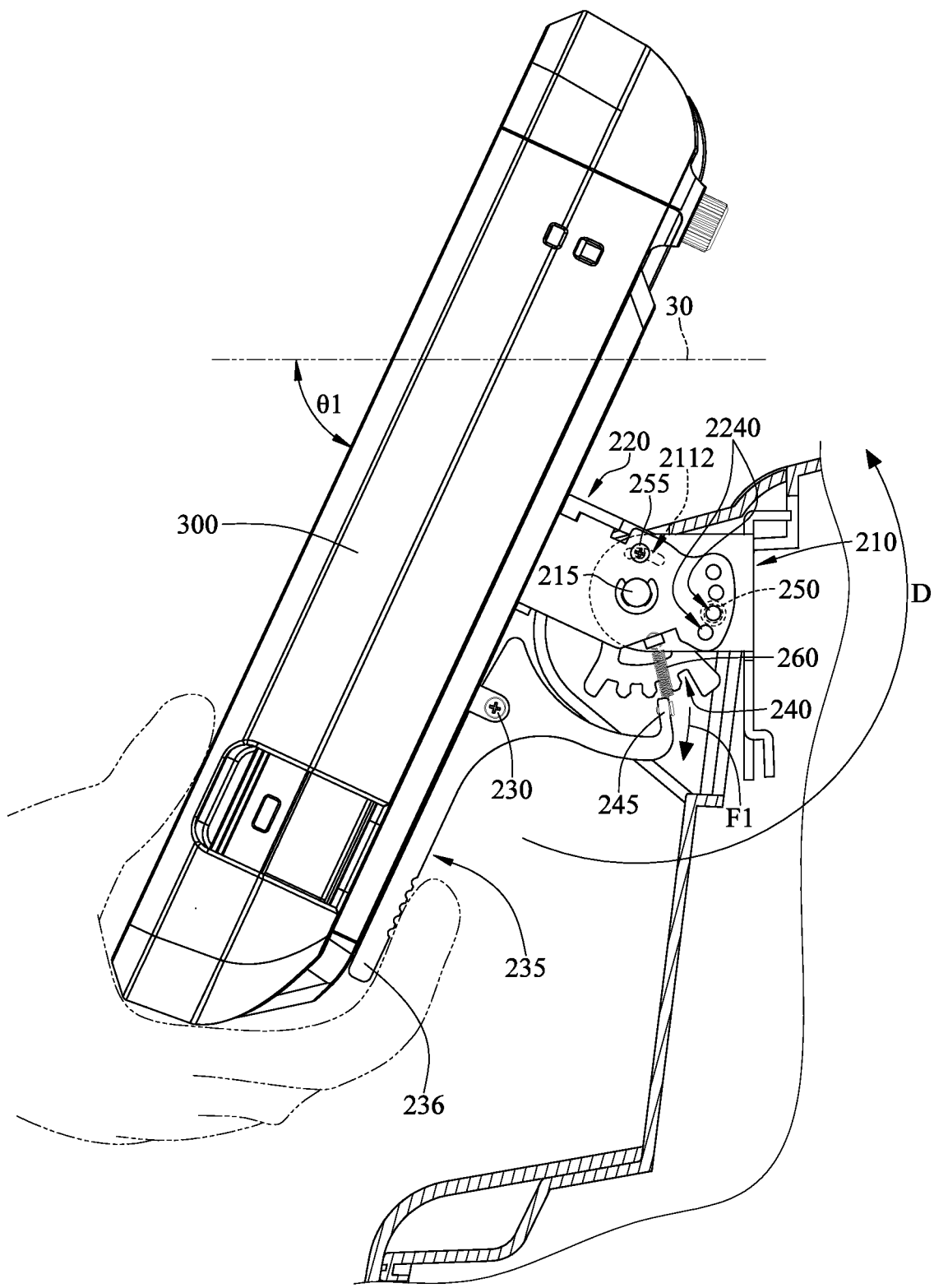
FIG. 6 is a partially enlarged and side cross-sectional view showing an operation of the display assembly in FIG. 1.
Figure 7:
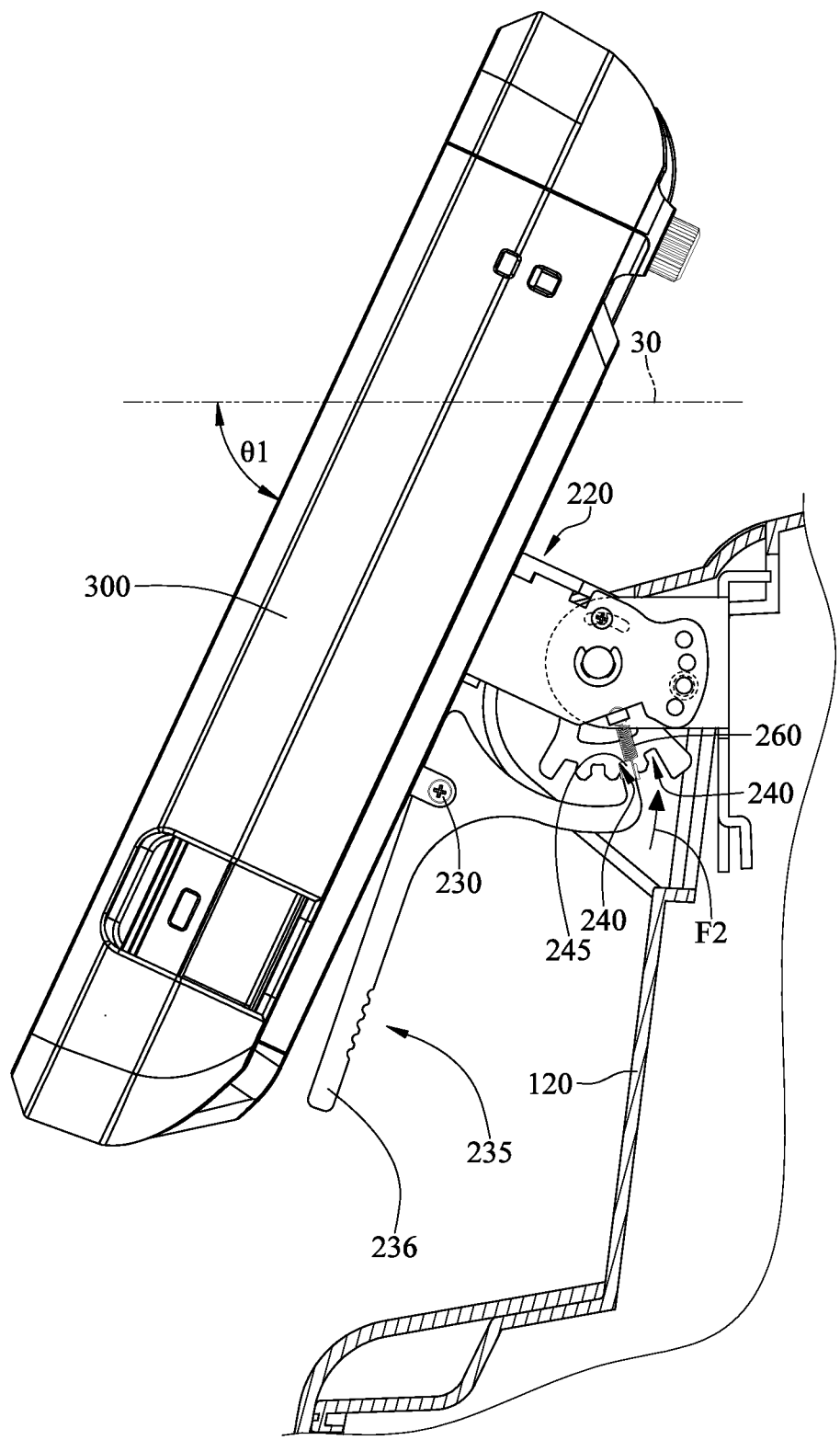
FIG. 7 is another partially enlarged and side cross-sectional view showing the operation of the display assembly in FIG. 1.

Please refer to FIG. 2, note that in this embodiment, an angle θ1 of one display 300 to a reference plane 30 parallel to the supporting surface 20 is allowed to be adjusted to be, for example, 35, 50, 65 or 80 degrees; an angle θ2 of the other display 300 to the reference plane 30 is allowed to be adjusted to 65 or 90 degrees. Please refer to FIGS. 6 and 7, where FIG. 6 is a partially enlarged and side cross-sectional view showing an operation of the display assembly 10 in FIG. 1, and FIG. 7 is another partially enlarged and side cross-sectional view showing the operation of the display assembly 10 in FIG. 1. Hereinafter, for example, it is illustrated that the angle θ1 of the one display 300 to the reference plane 30 is adjusted from 80 degrees (as shown in FIG. 5) to 65 degrees (as shown in FIGS. 6 and 7) via the mounting assembly 200 and then the one display 300 is positioned.

First, please refer to FIG. 6, when a user uses one hand to hold the handheld part 236 of the handle 235 and a side of the display 300 that is located farthest from the handle 235 and forces the handle 235 to be pivoted relative to the pivotable base 220 along a releasing direction F1 via the second pivots 230, such that the second engagement structure 245 is detached from the first engagement structure 240 that is located closest to the mounting arm 120, and the elastic component 260 extends to store elastic potential energy. Then, the user keeps using one hand to hold the handheld part 236 of the handle 235 and the side of the display 300 that is located farthest from the handle 235 and forces the pivotable base 220 to be pivoted relative to the fixed base 210 via the first pivot 215, thereby adjusted the angle θ1 of the display 300 fixed on the pivotable base 220 to the reference plane 30 from 80 degrees to 65 degrees. During the process of adjusting the angle θ1 of the display 300 to the reference plane 30 from 80 degrees to 65 degrees, the restriction component 255 slides in the restricting hole 2112 extending along the circumferential direction D of the first pivot 215 to restrict the movement of the pivotable base 220. When the angle θ1 of the display 300 to the reference plane 30 is adjusted from 80 degrees to 65 degrees, the positioning component 250 moves from the positioning hole 2240 located closest to the base 110 to another positioning hole 2240 located adjacent to the positioning hole 2240 located closest to the base 110, which allows the user to clearly recognize that the angle θ1 of the display 300 to the reference plane has been adjusted from 80 degrees to 65 degrees.

Next, please refer to FIG. 7, after the angle θ1 of the display 300 to the reference plane 30 is adjusted from 80 degrees to 65 degrees, the user releases the handheld part 236 of the handle 235 and the side of the display 300 located farthest from the handle 235, such that the extending elastic component 260 releases the elastic potential energy to force the handle 235 to be pivoted relative to the pivotable base 220 via the second pivots 230 along an engaging direction F2 opposite to the releasing direction F1. In this way, the second engagement structure 245 is engaged with another first engagement structure 240 located adjacent to the first engagement structure 240 located closest to the mounting arm 120.

Note that as shown in FIGS. 5 and 7, since the extension part 238 protrudes from the mounting part 237 along the circumferential direction D of the first pivot 215, and the second engagement structure 245 is disposed at the side of the extension part 238 located farthest from the mounting part 237, the second engagement structure 245 is allowed to be fitted and engaged with any one of the first engagement structures 240 smoothly. However, the disclosure is not limited to the protruding direction of the extension part 238. In other embodiments, the extension part may protrude along a tangent direction of the first pivot.

Moreover, as shown in FIGS. 5 and 7, since the second engagement structure 245 extends along the radial direction R of the first pivot 215 and/or the first engagement structures 240 are arranged along the circumferential direction D of the first pivot 215, the second engagement structure 245 is fitted and engaged with any one of the first engagement structures 240 smoothly. However, the disclosure is not limited by the extension direction of the second engagement structure 245 and the arrangement direction of the first engagement structures 240. In other embodiments, the second engagement structure may extend along a direction non-parallel to the radial direction of the first pivot, and the first engagement structures may be arranged along a tangent direction of the first pivot.

Since the handheld part 236 of the handle 235 is located adjacent to the side of the display 300 located closest to the base 110, the movement of the handle 235 is prevented from being disturbed by the display 300, thereby allowing the handle 235 to be applied to various sizes of the displays. However, the disclosure is not limited by the location of the handheld part 236 of the handle 235. In other embodiments, the handheld part of the handle may be located adjacent to a side of the display located farthest from the base.

Note that in this embodiment, the mounting assembly 200 includes the restriction components 255, and the side plates 2111 each have the restricting hole 2112, but the disclosure is not limited thereto. In other embodiments, the mounting assembly may not include the restriction components 255 and the two side plates may not have the restricting hole 2112, and the movement of the pivotable base may be restricted directly via operating the handle.

In addition, in this embodiment, the mounting assembly 200 includes the positioning component 250, and the side plate parts 224 each have the positioning holes 2240, but the disclosure is not limited thereto. In other embodiments, the mounting assembly may not include the positioning component 250 and the two side plate parts may not have the positioning holes 2240, and the user may directly observe whether the display is adjusted to the desired angle by eyes.

Moreover, in this embodiment, the mounting assembly 200 includes the elastic components 260, but the disclosure is not limited thereto. In other embodiments, the mounting assembly may not include the elastic components 260, and the second engagement structure may be engaged with any one of the first engagement structures via operating the handle.

Figure 8:
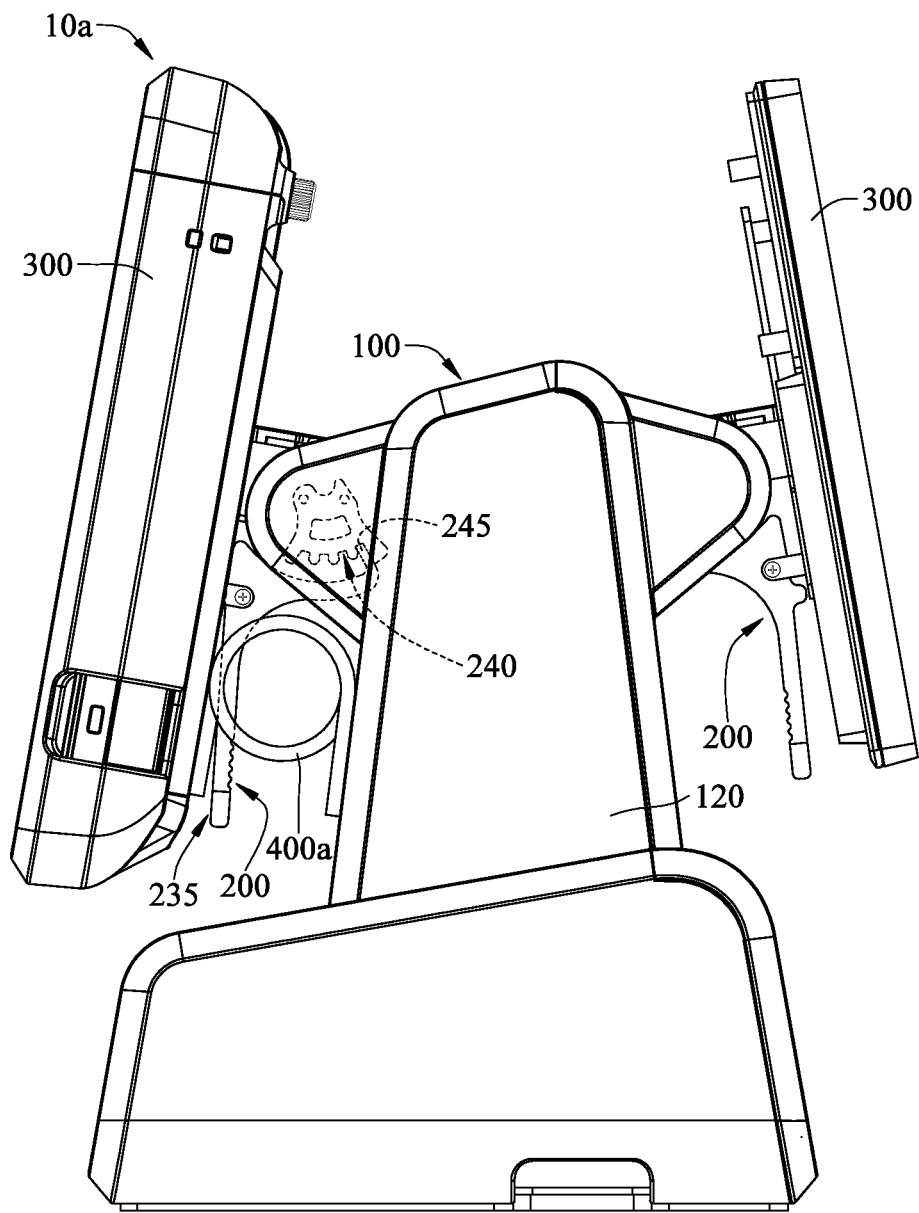
FIG. 8 is a side view of a display assembly according to a second embodiment of the disclosure.

Please refer to FIG. 8 that is a side view of a display assembly 10a according to a second embodiment of the disclosure. Note that the main difference between the display assembly 10a according to this embodiment and the display assembly 10 according to the first embodiment in FIGS. 1 to 7 is that the display assembly 10a according to this embodiment further includes a torsion spring 400a. The display assembly 10a according to this embodiment may include the stand 100, the two mounting assemblies 200 and the two displays 300 according to the first embodiment in FIGS. 1 to 7. Thus, hereinafter, only the torsion spring 400a will be described in detail, and the detail descriptions of the stand 100, the two mounting assemblies 200 and the two displays 300 are omitted. In this embodiment, two opposite ends of the torsion spring 400a are fixed to the display 300 and the mounting arm 120 of the stand 100, respectively. In this way, even though the handle 235 is released in a case that the second engagement structure 245 is detached from one of the first engagement structure 240, the torsion spring 400a supports the display 300 to prevent the hand of the user from being clamped by the display 300 and the mounting arm 120.

Figure 9:
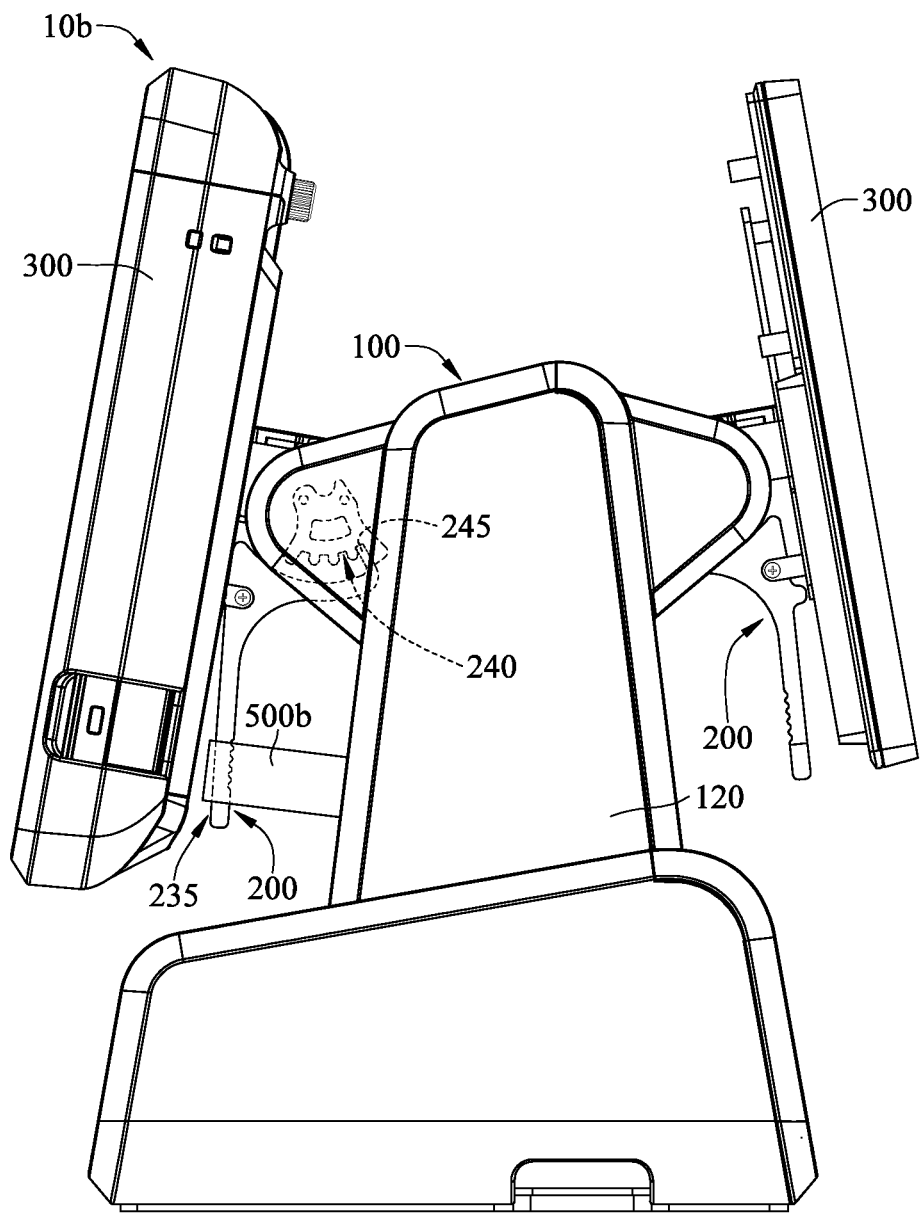
FIG. 9 is a side view of a display assembly according to a third embodiment of the disclosure.

The disclosure is not limited to use the torsion spring for preventing the hand from being clamped by the display and the mounting arm. Please refer to FIG. 9 that is a side view of a display assembly 10b according to a third embodiment of the disclosure. Note that the main difference between the display assembly 10b according to this embodiment and the display assembly 10 according to the first embodiment in FIGS. 1 to 7 is that the display assembly 10b according to this embodiment further includes a pad 500b. The display assembly 10b according to this embodiment may include the stand 100, the two mounting assemblies 200 and the two displays 300 according to the first embodiment in FIGS. 1 to 7. Thus, hereinafter, only the pad 500b will be described in detail, and the detail descriptions of the stand 100, the two mounting assemblies 200 and the two displays 300 are omitted. In this embodiment, the pad 500b protrudes from a side of the mounting arm 120 of the stand 100 that is located closest to the display 300 to be clamped between the display 300 and the mounting arm 120 of the stand 100. Accordingly, even though the handle 235 is released in a case that the second engagement structure 245 is detached from the first engagement structure 240, the pad 500b supports the display 300 to prevent the hand of the user from being clamped by the display 300 and the mounting arm 120.

According to the display assembly disclosed by the above embodiments, since the first pivot is not coaxial with the second pivot, the second engagement structure disposed on the handle pivotally connected to the pivotable base via the second pivot is allowed to be moved along the radial direction of the first pivot so as to be fitted and engaged with any one of the first engagement structures. In this way, by holding the handheld part of the handle and the display with one hand, the user is allowed to pivot the handle relative to the display via the second pivot to force the second engagement structure to be detached from one of the first engagement structures, thereby by releasing the display. Then, by keeping holding the handheld part of the handle and the display with one hand, the user is allowed to pivot the display relative to the base via the first pivot to adjust the angle therebetween, and then the handle can be pivoted relative to the display via the second pivot to engage and fit the second engagement structure with another one of the first engagement structures, thereby positioning the display. That is, with the help of the mounting assembly according to this disclosure, the display can be adjusted to a desired angle and fixed in position by one hand at a time.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A display assembly, comprising:
a stand;
a mounting assembly, comprising:
  a fixed base, fixed to the stand;
  a first pivot, disposed on the fixed base;
  a pivotable base, disposed on the first pivot and pivotally connected to the fixed base via the first pivot;
  a second pivot, disposed on the pivotable base;
  a handle, comprising a handheld part and a mounting part, wherein the mounting part is connected to the handheld part and pivotally connected to the pivotable base via the second pivot; and
  a plurality of first engagement structures and a second engagement structure, wherein the second engagement structure corresponds to the plurality of first engagement structures, the plurality of first engagement structures are disposed at one of the fixed base and the mounting part of the handle, and the second engagement structure is disposed at another one of the fixed base and the mounting part of the handle; and
a display, fixed on the pivotable base; and
wherein, the first pivot is not coaxial with the second pivot so that the second engagement structure is configured to be engaged with any one of the plurality of first engagement structures.

2. The display assembly according to claim 1, wherein the handle of the mounting assembly further comprises an extension part, the extension part protrudes from the mounting part along a circumferential direction of the first pivot, the second engagement structure is disposed at a side of the extension part that is located farthest from the mounting part and is disposed on the mounting part via the extension part, and the plurality of first engagement structures are disposed at the fixed base.

3. The display assembly according to claim 2, wherein the second engagement structure extends along a radial direction of the first pivot.

4. The display assembly according to claim 1, wherein the stand comprises a base and a mounting arm, the mounting arm comprises a first end part and a second end part that are opposite to each other, the base is disposed on the first end part, the fixed base is fixed to the second end part, and the handheld part of the handle is located adjacent to a side of the display that is located closest to the base.

5. The display assembly according to claim 1, wherein the fixed base comprise a mounting bracket and a mounting body, the mounting bracket comprises a bottom plate and two side plates, the two side plates stand on a side of the bottom plate and are spaced apart from each other, the mounting body is fixed to the two side plates and is located between the two side plates, the mounting bracket is fixed to the stand, the plurality of first engagement structures are disposed at the mounting body, the second engagement structure is disposed at the mounting part of the handle, the mounting body has a recess, the recess and the plurality of first engagement structures are disposed at two opposite sides of the mounting body, respectively, and the first pivot is disposed in the recess and is disposed through the two side plates.

6. The display assembly according to claim 5, wherein the pivotable base comprises a first plate part, a second plate part, a third plate part and two side plate parts, the first plate part and the third plate part are connected to two opposite sides of the second plate part, respectively, the two side plate parts stand on a side of the second plate part and are spaced apart from each other, the display is fixed to the first plate part, the first pivot is disposed through the two side plate parts, the two side plates of the mounting bracket of the fixed base are located between the two side plate parts, and the second pivot is disposed through the third plate part.

7. The display assembly according to claim 6, wherein the mounting assembly further comprises two restriction components, each of the two side plates has a restricting hole extending along a circumferential direction of the first pivot, sides of the two restriction components are fixed to the two side plate parts, respectively, and other sides of the two restriction components are slidably disposed in the restricting holes of the two side plates, respectively.

8. The display assembly according to claim 6, wherein the mounting assembly further comprises two positioning components, each of the two side plate parts has a plurality of positioning holes arranged along a circumferential direction of the first pivot, sides of the two positioning components are fixed to the two side plates, respectively, and other sides of the two positioning components are configured to be positioned in any one of the plurality of positioning holes of the two side plate parts, respectively.

9. The display assembly according to claim 1, wherein the plurality of first engagement structures are disposed at the fixed base, the second engagement structure is disposed at the mounting part of the handle, the plurality of first engagement structures are engagement recesses and the second engagement structure is an engagement protrusion, the mounting assembly further comprises an elastic component, and two opposite ends of the elastic component are fixed to the pivotable base and the second engagement structure, respectively.

10. A display assembly, comprising:
a stand;
a fixed base, fixed to the stand;
a first pivot, disposed on the fixed base;
a display, disposed on the first pivot and pivotally connected to the fixed base via the first pivot;
a second pivot, disposed on the display;
a handle, comprising a handheld part and a mounting part, wherein the mounting part is connected to the handheld part and is pivotally connected to the display via the second pivot; and
a plurality of first engagement structures and a second engagement structure, wherein the second engagement structure corresponds to the plurality of first engagement structures, the plurality of first engagement structures are disposed at one of the fixed base and the mounting part of the handle, and the second engagement structure is disposed at another one of the fixed base and the mounting part of the handle;
wherein, the first pivot is not coaxial with the second pivot so that the second engagement structure is configured to be engaged with any one of the plurality of first engagement structures.

* * * * *